United States Patent
Wiesman

(10) Patent No.: US 9,600,819 B2
(45) Date of Patent: Mar. 21, 2017

(54) SYSTEMS AND METHODS FOR RISK BASED DECISIONING

(71) Applicant: MasterCard International Incorporated, Purchase, NY (US)

(72) Inventor: Mark B. Wiesman, Chesterfield, MO (US)

(73) Assignee: MasterCard International Incorporated, Purchase, NY (US)

( * ) Notice: Subject to any disclaimer, the term of this patent is extended or adjusted under 35 U.S.C. 154(b) by 69 days.

(21) Appl. No.: 14/640,701

(22) Filed: Mar. 6, 2015

(65) Prior Publication Data
US 2016/0260100 A1  Sep. 8, 2016

(51) Int. Cl.
*G06Q 20/40* (2012.01)

(52) U.S. Cl.
CPC ....... *G06Q 20/4016* (2013.01); *G06Q 20/405* (2013.01)

(58) Field of Classification Search
CPC .......................... G06Q 20/4016; G06Q 20/405
See application file for complete search history.

(56) References Cited

U.S. PATENT DOCUMENTS

| | | | |
|---|---|---|---|
| 6,658,393 B1 | 12/2003 | Basch et al. | |
| 7,707,089 B1 * | 4/2010 | Barton ................... | G06Q 20/10 235/380 |
| 8,126,791 B2 | 2/2012 | Chisholm | |
| 8,474,018 B2 | 6/2013 | Mardikar et al. | |
| 2004/0236696 A1 | 11/2004 | Aoki et al. | |
| 2005/0149455 A1 * | 7/2005 | Bruesewitz ............ | G06Q 20/04 705/64 |
| 2009/0292568 A1 | 11/2009 | Khosravani et al. | |
| 2010/0010930 A1 | 1/2010 | Allen et al. | |
| 2010/0114776 A1 * | 5/2010 | Weller .................... | G06F 21/31 705/44 |
| 2010/0274720 A1 | 10/2010 | Carlson et al. | |
| 2011/0191200 A1 | 8/2011 | Bayer et al. | |
| 2012/0259784 A1 | 10/2012 | Carlson et al. | |
| 2012/0310831 A1 | 12/2012 | Harris et al. | |
| 2013/0283356 A1 | 10/2013 | Mardikar et al. | |

(Continued)

FOREIGN PATENT DOCUMENTS

WO  2015013522 A1  1/2015

OTHER PUBLICATIONS

International Search Report and Written Opinion, dated Jun. 22, 2016, for co-pending International application No. PCT/US2016/020725 (16 pgs.).

*Primary Examiner* — Kristy A Haupt
(74) *Attorney, Agent, or Firm* — Armstrong Teasdale LLP

(57) ABSTRACT

A method and system for creating an assurance level based on authentication data attributes using a computer device coupled to a database are provided. The method includes receiving an authorization request associated with the financial transaction from the sender, the authorization request including a fraud risk assessment of the financial transaction determined by the sender using an authentication response received from the computer device by the sender, the authorization request including one or more reason codes associated with the sender fraud risk assessment. The method further includes transmitting the received authorization request to an issuer associated with the cardholder.

20 Claims, 8 Drawing Sheets

(56) References Cited

U.S. PATENT DOCUMENTS

| | | | |
|---|---|---|---|
| 2014/0279556 A1* | 9/2014 | Priebatsch | G06Q 20/322 705/67 |
| 2014/0279641 A1 | 9/2014 | Singh et al. | |
| 2015/0012430 A1* | 1/2015 | Chisholm | G06Q 20/34 705/44 |
| 2015/0026769 A1 | 1/2015 | Woundy et al. | |
| 2015/0052050 A1 | 2/2015 | Mankad et al. | |
| 2015/0066768 A1 | 3/2015 | Williamson et al. | |

\* cited by examiner

SYSTEMS AND METHODS FOR RISK BASED DECISIONING

BACKGROUND

This disclosure relates generally to risk and fraud associated with payment transaction card accounts, and more particularly, to network-based methods and systems for determining risk and/or fraud associated with a payment card account using an assurance level of a financial transaction based on authentication data attributes.

At least some known credit/debit card purchases involve the exchange of a number of payment card network messages between merchant, acquirer, and issuer members of a multi-party interchange model. Such messages may include authorizations, advices, reversals, account status inquiry presentments, purchase returns and chargebacks.

The credit or debit card payment transaction messages may include several transaction attributes, such as, but, not limited to, primary account number (either real or virtual), transaction amount, merchant identifier, acquirer identifier (the combination of which with above uniquely identifies a merchant), transaction date-time, and address verification.

Fraudulent payment transactions are attempted to be detected and prevented by current systems using a fraud measure or prediction, also known as a "score." The measure or score is conveyed to one or more of the parties to the transaction that may have liability for the transaction if it turns out to be fraudulent, for example, a merchant, an acquirer, an authorized agent thereof, or an issuer, which enables the party that would be liable to make a more informed decision on whether to proceed with the transaction or not.

Currently, when determining an authorization's fraud prediction score, these systems use, for example, but not limited to attributes of the authorization, the card's payment history, such as authorization and clearing transaction details and chargebacks, and offline input such as, reports from issuers, merchants, acquirer, cardholders, and law enforcement of compromised PAN or other transaction attributes. Alternatively, a number of authorizations deemed probably fraudulent by the system can result in a PAN or other attribute being marked as "compromised".

Recently, the Credit/Debit card purchase industry has launched technologies to solve security-related issues and also ease-of-use issues. Examples of these new technologies include Payment Gateway, 3-D Secure, Digital Wallet, Controlled Payment Number, and Online Authentication.

Each of these technologies is associated with messages, which are sometimes referred to as "E-commerce messages" and are used in conjunction with purchases. These e-commerce messages as well as containing a PAN may also contain the following "e-commerce message attributes": addresses (e.g. billing and shipping), email addresses, phone numbers, and application account id (e.g. wallet id). In addition, because the E-commerce messages are online messages, the IP Address, and fingerprint of the device used may readily be determined if not contained directly in the messages. The E-commerce "Transaction Trust Score" (ETTS) is a function of its attributes pairing history and in some aspects its attributes reputation.

Some known real-world systems purport to return a "trust score" on an E-commerce transaction, which is typically based on establishing a track record of usage of the device (as identified by one or more device fingerprints wherein the device can be any mobile device, for example a laptop, a mobile phone, or tablet with other E-commerce attributes, such as, an address or an IP address. The trust score may also include an attribute reputation, for example, but, not limited to a compromised IP address or a compromised email address, which may be obtained from offline input. However, these systems can only return an E-commerce Transaction Trust Score (ETTS) on a particular E-commerce Transaction if queried with a device fingerprint and one or more other message attributes used in the same transaction.

Accordingly, it would be desirable to improve the ability to determine a risk of fraud and trustworthiness of the account information using device fingerprints in combination with other message attributes.

BRIEF DESCRIPTION

In one embodiment, a computer-implemented method for creating an assurance level based on authentication data attributes using a computer device coupled to a database includes receiving an authorization request associated with the financial transaction from the sender wherein the authorization request includes a fraud risk assessment of the financial transaction determined by the sender using an authentication response received from the computer device by the sender. The authorization request includes one or more reason codes associated with the sender fraud risk assessment. The method further includes transmitting the received authorization request to an issuer associated with the cardholder.

In another embodiment, a risk-based decisioning system for creating an assurance level based on authentication data attributes includes a merchant computer device coupled to a payment network wherein the computer device is configured to transmit an authentication request from the merchant computer device to the payment network when a cardholder interacting with a merchant website is attempting to perform activities inconsistent with at least one of a transaction history of the cardholder and a profile of the cardholder wherein the authentication request is separate from an authorization request. The computer device is also configured to receive, from the payment network, a response that indicates a trustworthiness of the cardholder, perform a secondary authentication evaluation that generates a merchant assessment of the trustworthiness of the cardholder based on the secondary authentication evaluation, and transmit an authorization request onto the payment network if the generated merchant assessment of trustworthiness indicates the cardholder is trustworthy. The computer device is further configured to receive an authorization approval or denial based at least partially on the generated merchant assessment of trustworthiness, and complete the financial transaction based on the received authorization approval or denial.

In yet another embodiment, one or more non-transitory computer-readable storage media has computer-executable instructions embodied thereon, wherein when executed by at least one processor, the computer-executable instructions cause the processor to receive an authentication request from a sender wherein the authentication request is associated with the financial transaction and includes interaction data relating to a cardholder interaction with the sender. The computer-executable instructions further cause the processor to transmit an authentication response to the sender, the authentication response including results of an authentication routine performed by the computer device using the received interaction data and historical transaction data of the cardholder. The computer-executable instructions also cause the processor to receive an authorization request associated with the financial transaction from the sender wherein the authorization request includes a fraud risk assessment of the financial transaction provided by the sender using the authentication response and the authorization request includes one or more reason codes associated with the fraud risk assessment. The computer-executable instructions also cause the processor to transmit the received authorization request to an issuer associated with the cardholder.

BRIEF DESCRIPTION OF THE DRAWINGS

FIG. 1 is a schematic diagram illustrating an example multi-party payment card industry system having a sender trust assessment module and that enables payment transactions between merchants and cardholders.

FIG. 2 is a simplified block diagram of an example payment processing system including a plurality of computer devices including the sender trust assessment module shown in FIG. 1 for influencing a fraud determination in a financial transaction based on a sender confidence level in accordance with an example embodiment of the present disclosure.

FIG. 3 is an expanded block diagram of an example embodiment of a server architecture of the payment processing system shown in FIG. 2 in accordance with one example embodiment of the present disclosure.

FIG. 4 illustrates an example configuration of a user system operated by a user, such as cardholder shown in FIG. 1.

FIG. 5 illustrates an example configuration of a server system such as server system shown in FIGS. 2 and 3.

FIG. 6 illustrates a data flow diagram of a risk-based decisioning process that uses input from a sender, for example, but not limited to the merchant, that represents the sender's perception of the fraud risk in a transaction with a cardholder.

FIG. 7 is a flow chart of a method of creating an assurance level based on authentication data attributes.

FIG. 8 is a diagram of components of one or more example computing devices that may be used in the environment shown in FIG. 6.

DETAILED DESCRIPTION

Figure 1:
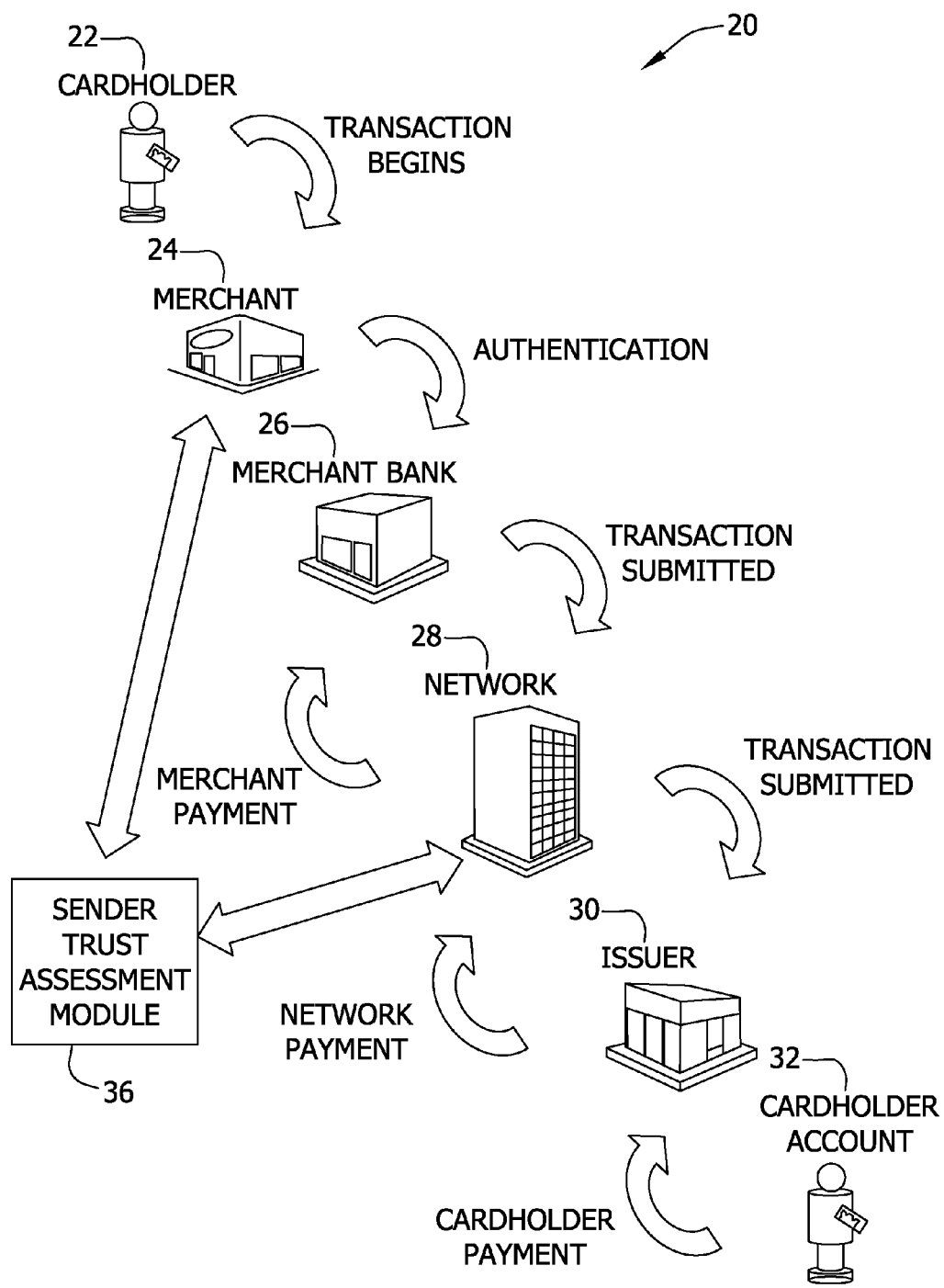
FIGS. 1-8 show example embodiments of the methods and systems described herein.

Embodiments of the disclosure describe a risk-based decisioning process that uses a sender's (i.e., merchant's) input that represents the sender's perception of the fraud risk in a transaction with a cardholder. A defined data field, for example, "sender confidence level," or "assurance level" included within a message allows inbound requests from participating merchants to contain a fraud score or fraud score interpretation of how the merchant assesses the risk associated with the transaction. The merchant includes a merchant fraud score and associated descriptive reason codes in an authorization request message or in a separate message sent through the payment network to an issuing bank prior to sending the authorization request message for the transaction. Accordingly, the message is sent by the merchant through the payment network to the issuing bank for further review and response.

Embodiments of the disclosure are focused on creating an assurance level based on authentication data attributes. One example of authentication data attributes includes pairs of information (e.g. device id and PAN) attributable or associated with a cardholder. Because at least some perspective merchants do not permit the integration of third party software into their systems, an ability to collect the device id is inhibited. In some embodiments, the system overall is modified to permit different levels of participation, including an option that includes the merchant fraud score and associated descriptive reason codes. Such information is used to facilitate driving trust based on this merchant input and subsequently provide a mechanism to pass this information through to the issuer in the authorization message.

The merchant fraud score and reason codes facilitate driving trust in the fraud assessment based on this merchant input and the risk-based decisioning process provides a mechanism for passing the merchant fraud score and reason codes through to the issuer in the authorization message.

During a transaction between, for example, a cardholder and a merchant, which is likely to be an online merchant, authentication takes place before or concurrent with the authorization. For a cardholder shopping online, at some point before the cardholder presses a "buy" button, or when the cardholder presses the "buy" button, but before the authorization request is submitted onto the payment network, the merchant is scoring the cardholder. The merchant attempts to determine if the cardholder is a trusted entity or not. These attempts are typically conducted without the underlying authentication process being apparent to the cardholder. For example, a cardholder accesses an associated online banking site from home, which is the usual place from which the cardholder accesses the online banking site and the site responds without problems. However, at a different time, the cardholder accesses the associated online banking site from work, which is not the usual place from which the cardholder accesses the online banking site. The site may respond differently to the cardholder attempting to access the online banking site from a different computing device such that the cardholder may be asked security questions until an assurance level or level of trust is established that the cardholder is the actual cardholder and not an impostor attempting to make a fraudulent transaction. This process is sometimes referred to as risk-based authentication.

In accordance with embodiments of the present disclosure, the merchant makes an authentication request that is separate from an authorization request to the payment network to request help in assessing the fraud risk. The payment network responds with a response back to the merchant, or back to the sender of the request with a result that indicates whether or not this cardholder is for example, "highly trusted", "trusted", "don't know enough to trust", or "known to be a risk". And based on that, that merchant decides whether or not the merchant should perform a secondary evaluation or step-up process, which is a secondary authentication process. The secondary authentication process may include the security questions described above. The merchant secondary authentication process may be triggered when the cardholder is attempting to perform activities inconsistent with the cardholder transaction history and/or cardholder profile. If the cardholder responds to the secondary authentication process correctly, an authorization request is submitted onto the payment network. When that authorization request is processed through the payment network, the payment network appends the merchant risk score into the authorization message and transmits the appended authorization request to the issuer. The issuer then has an additional indication of trust for that cardholder to facilitate making the authorization determination.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system having a sender trust assessment module 36 and that enables payment transactions between merchants 24 and cardholders 22. Embodiments described herein may relate to a financial transaction card system, such as a payment network operated by MasterCard International Incorporated. The payment network, as described herein, is a multi-party payment network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20.

In a typical payment card system, a financial institution called the "issuer" issues a payment card, such as a credit card, to a consumer or cardholder 22, who uses the payment card to tender payment for a purchase from a merchant 24. In various embodiments of the present disclosure, merchant 24 is also known as a "sender." To accept payment with the payment card, merchant 24 must normally establish an account with a financial institution that is part of the financial payment processing system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, cardholder account information, a type of transaction, product or service for sale information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Network 28 is configured to interface with a payment platform 34 configured to process payments between a merchant and a consumer 36 that is not necessarily a cardholder 32. Payment platform 34 permits transactions that would otherwise be conducted using cash or other payment methods to being conducted using network 28. A transaction platform 38 is configured to operate in conjunction with payment platform 34 to receive information relating to an item or service for sale and to transmit such information to social media outlets selected and controlled by the merchant user. The merchant user is not necessarily cardholder 22 or merchant 24.

Figure 2:
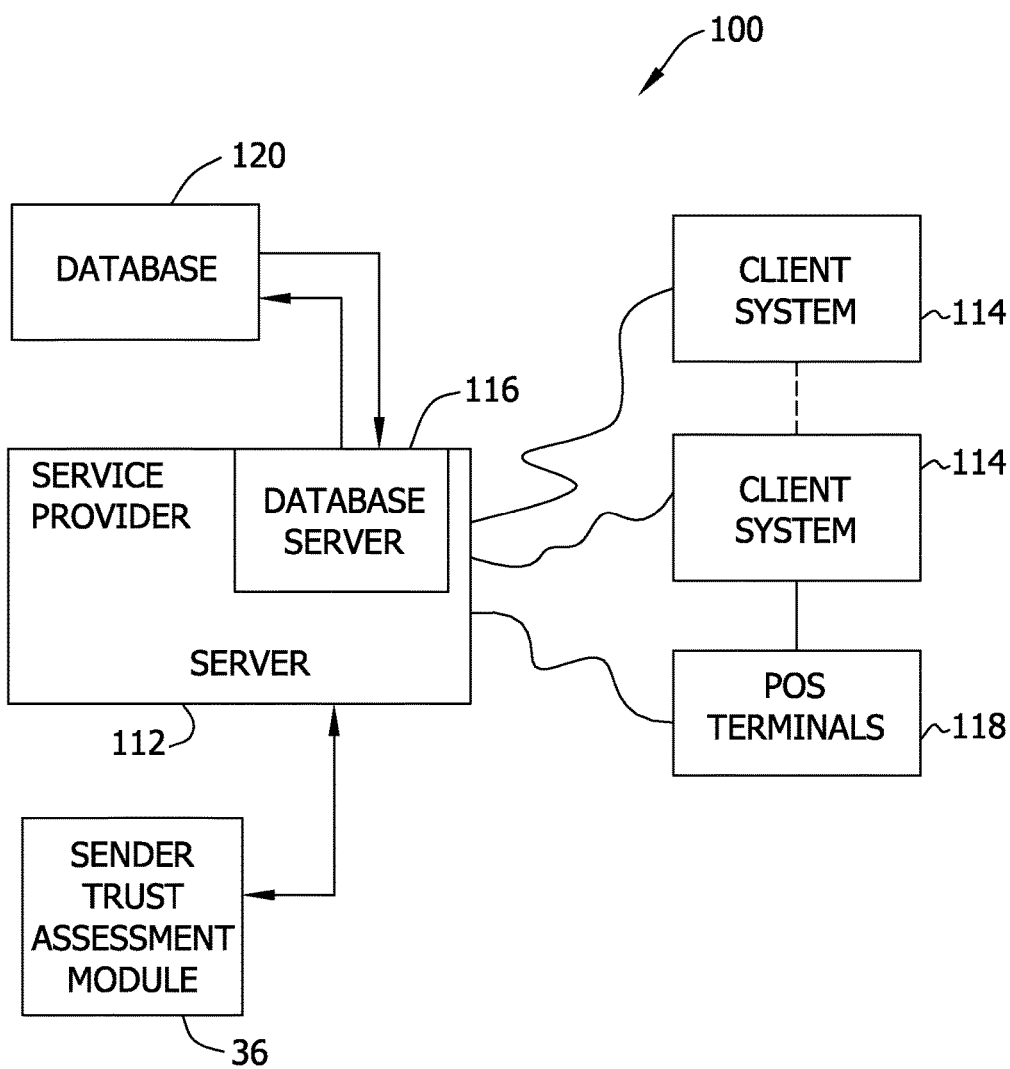

FIG. 2 is a simplified block diagram of an example payment processing system 100 including a plurality of computer devices including sender trust assessment module 36 (shown in FIG. 1) for influencing a fraud determination in a financial transaction based on a sender confidence level or assurance level in accordance with one example embodiment of the present disclosure. In the example embodiment, the plurality of computer devices includes, for example, server system 112, client systems 114, payment platform module 34, transaction platform 38, and cardholder computing device 121. In one embodiment, payment system 100 implements a process to validate a payment card transaction. More specifically, payment platform module 34 in communication with server system 112 is configured to receive information relating to an item or service for sale by a merchant user, and store the information in a memory device as one of a plurality of information items for a plurality of items or services for sale. Payment platform module 34 is also configured to transmit the information relating to an item or service for sale by a merchant user to selectable social media outlets associated with the merchant user. In some embodiments, the social media outlet privacy and or publication options control the dissemination of the information to consumers associated with the merchant user. In other embodiments, transaction platform 38 and/or payment platform 34 interact with the selected social media outlets to control the dissemination of the information relating to an item or service for sale by a merchant user. Payment platform module 34 is further configured to enable selling of products and services over social media outlets.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, a primary account number (PAN) associated with the cardholder name, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store picture files associated with the item or service for sale by the merchant user, name, price, description, shipping and delivery information, instructions for facilitating the transaction, and other information to facilitate processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment network 28. In the example embodiment, server system 112 is associated with a financial transaction processing network, such as payment network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, a payment platform 34, and/or a transaction platform 38. Payment platform 34, and/or a transaction platform 38 may be associated with payment network 28 or with an outside third party in a contractual relationship with payment network 28. Accordingly, each party involved in processing transaction data are associated with a computer system shown in system 100 such that the parties can communicate with one another as described herein.

Using payment network 28, the computers of the merchant bank or the merchant processor communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
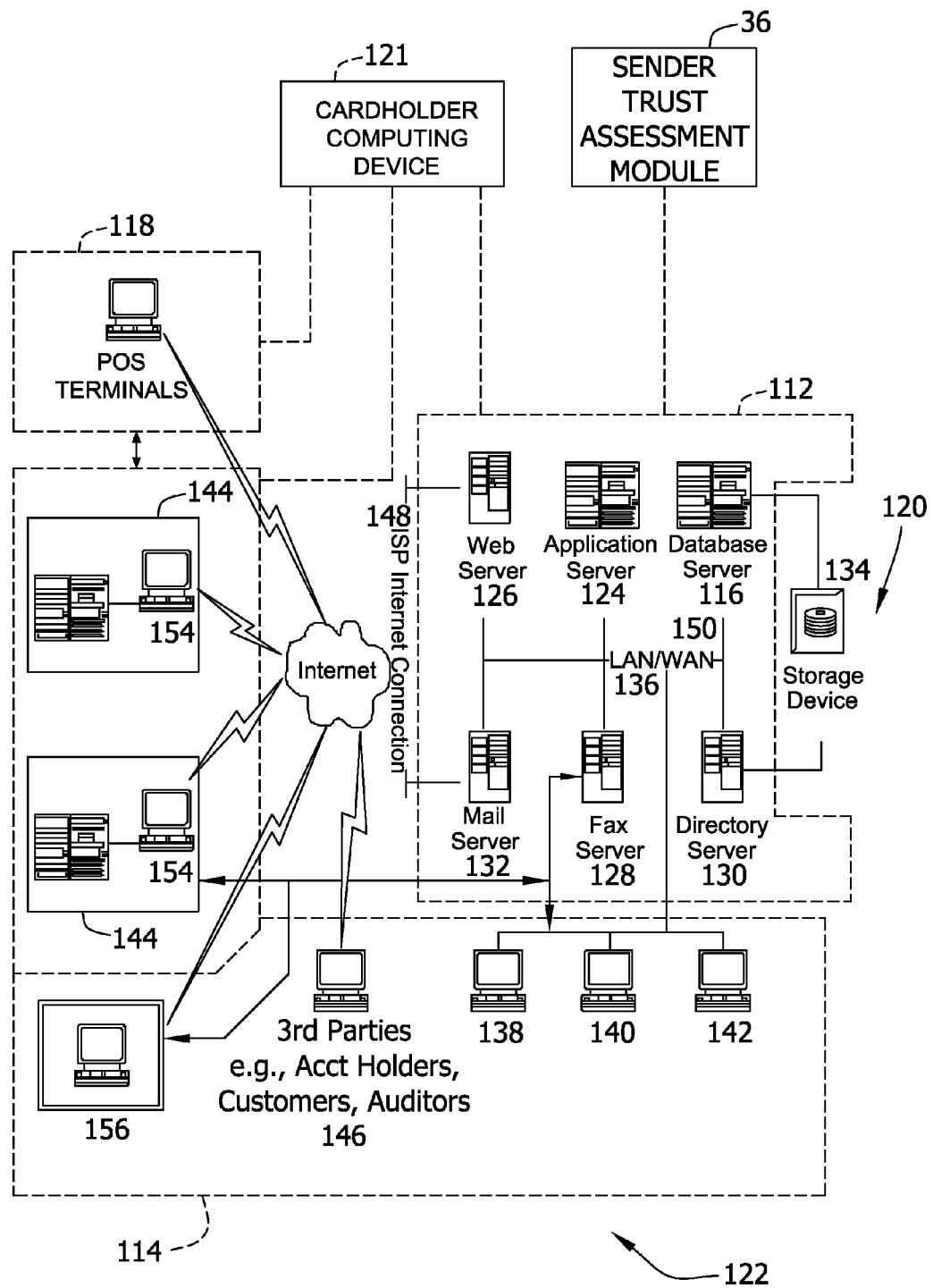

FIG. 3 is an expanded block diagram of an example embodiment of a server architecture of the payment processing system shown in FIG. 2 in accordance with one example embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet. Processing system 122 also includes payment platform 34, and/or a transaction platform 38.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
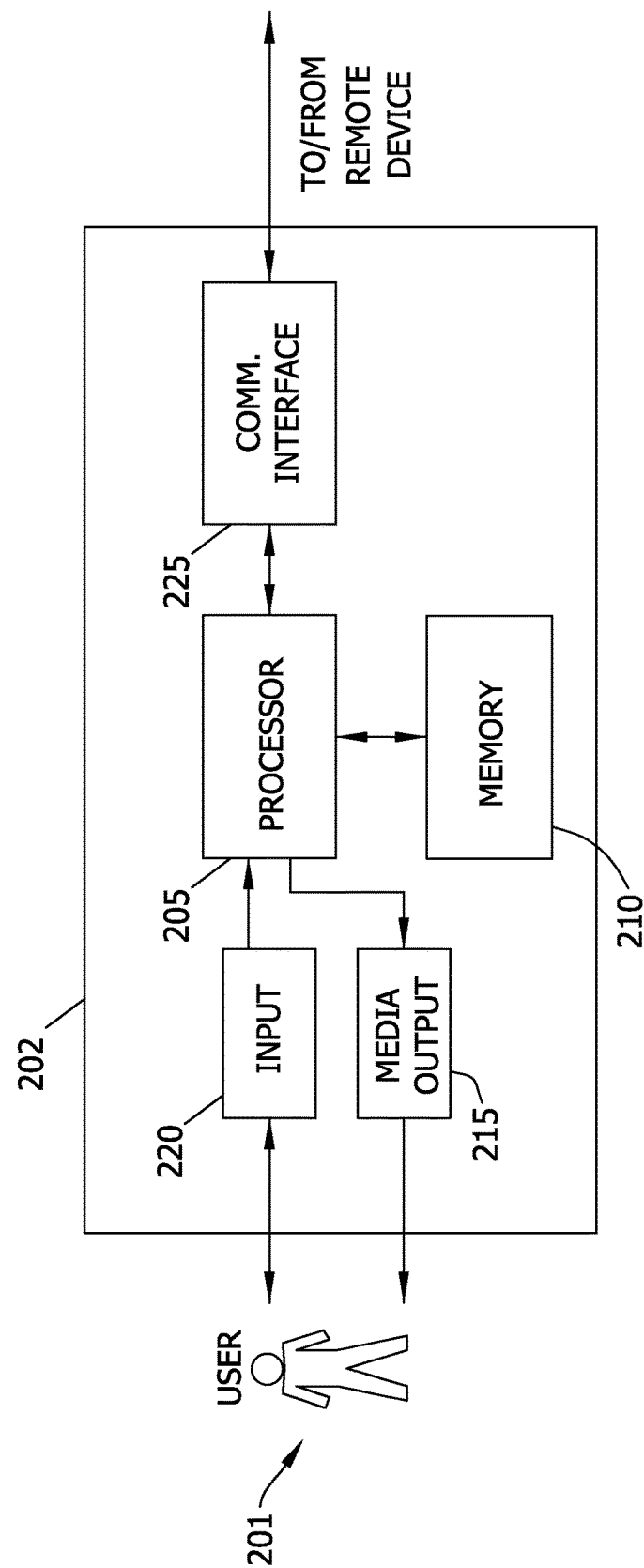

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
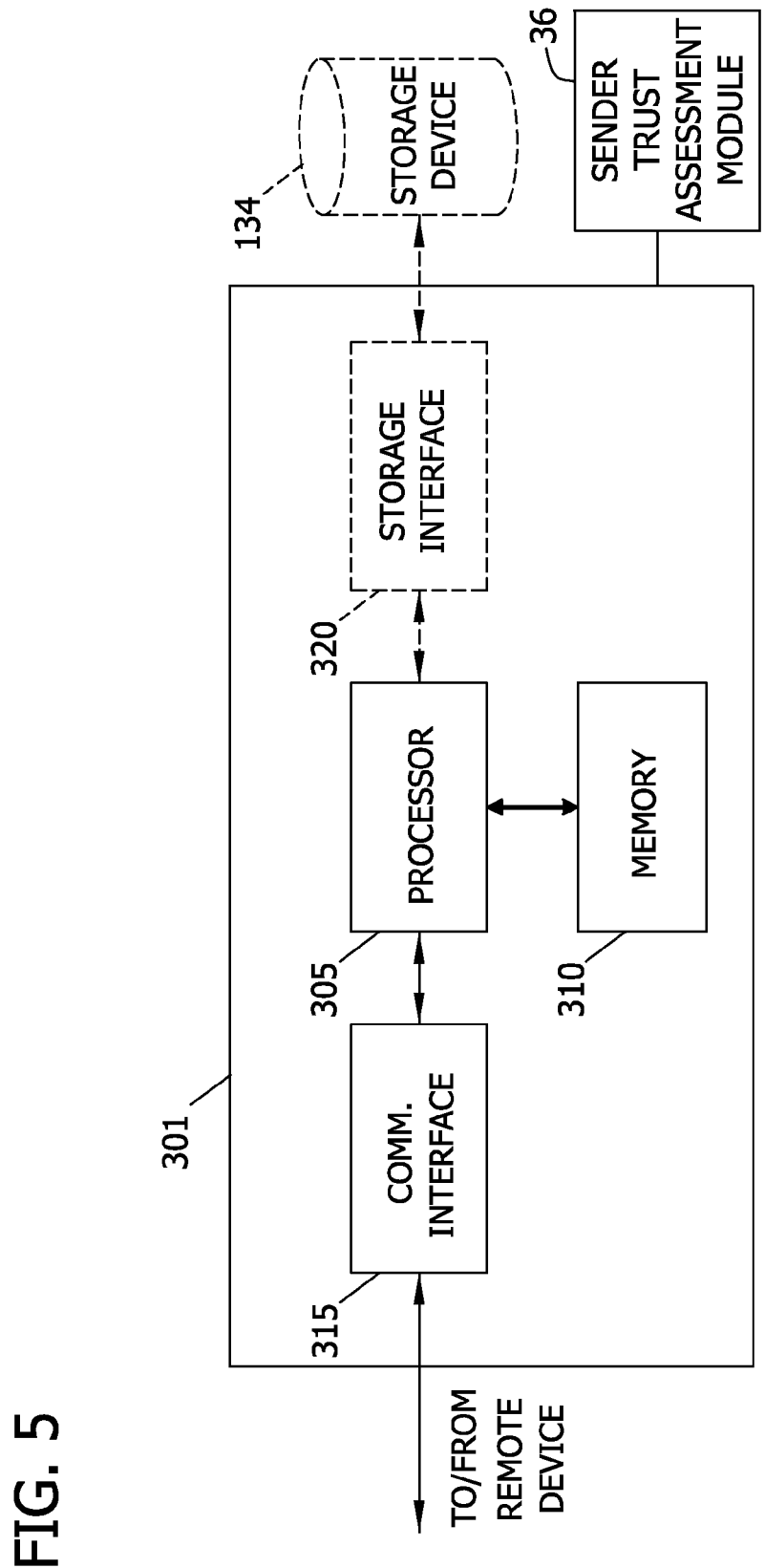

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Server system 301 may be communicatively coupled to payment platform module 34, and/or transaction platform 38. Payment platform module 34 in communication with server system 112 is configured to receive information relating to an item or service for sale by a merchant user, and store the information in a memory device as one of a plurality of information items for a plurality of items or services for sale. Payment platform module 34 is also configured to transmit the information relating to an item or service for sale by a merchant user to selectable social media outlets associated with the merchant user. Payment platform module 34 is further configured to enable selling of products and services over social media outlets. In the example embodiment, payment platform module 34 may be external to server system 301 and may be accessed by multiple server systems 301. For example, payment platform module 34 may be a computing device coupled to a memory unit. In some embodiments, payment platform module 34 may be integrated with server system 301. For example, payment platform module 34 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
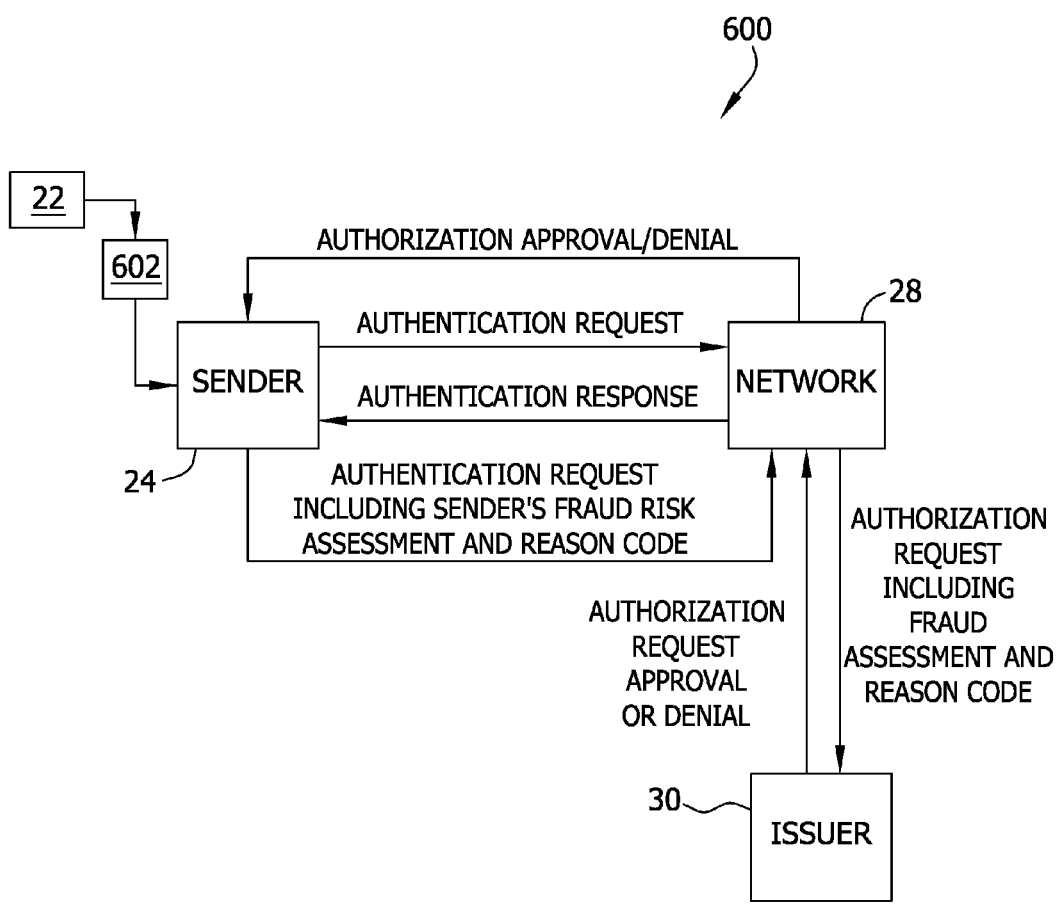

FIG. 6 illustrates a data flow diagram 600 of risk-based decisioning process that uses input from a sender, for example, but not limited to merchant 24 that represents the sender's perception of the fraud risk in a transaction with a cardholder. A defined data field, for example, "sender confidence level," or "assurance level" included within a message allows inbound requests from participating merchants to contain a fraud score or fraud score interpretation of how merchant 24 assesses the risk associated with the transaction. Merchant 24 includes a merchant fraud score and associated descriptive reason codes in an authorization request message or in a separate message sent through the payment network to an issuing bank prior to sending the authorization request message for the transaction. Accordingly, the message is sent by merchant 24 through payment network 28 to the issuing bank for further review and response.

During a transaction between, for example, cardholder 22 and merchant 24, which is likely to be an online merchant, an authentication process takes place before or concurrent with the authorization request processes. Typically merchant 24 scores cardholder 22 in an ongoing authentication process. For example, while cardholder 22 is shopping online on a website 602 of merchant 24, at some point before cardholder 22 presses a "buy" button, or when cardholder 22 presses the "buy" button, but before the authorization request is submitted onto payment network 28, merchant 24 generates scores based on the activity of cardholder 22 while cardholder 22 is interacting with the website. Merchant 24 attempts to determine if cardholder 22 is a trusted entity or not. These attempts are typically conducted without the underlying authentication process being apparent to cardholder 22. For example, a cardholder accesses an associated online banking site from home, which is the usual place from which cardholder 22 accesses the online banking site and the site responds without problems. However, at a different time, cardholder 22 accesses the associated online banking site from work, which is not the usual place from which cardholder 22 accesses the online banking site. The site may respond differently to cardholder 22 attempting to access the online banking site from a different computing device such that cardholder 22 may be asked security questions until an assurance level or level of trust is established that cardholder 22 is the actual cardholder and not an impostor attempting to make a fraudulent transaction. This process is sometimes referred to as risk-based authentication.

In accordance with embodiments of the present disclosure, merchant 24 makes an authentication request that is separate from an authorization request to payment network 28 to request help in assessing the fraud risk. Payment network 28 responds with a response back to merchant 24, or back to the sender of the request, if the sender is someone other than merchant 24, with a result that indicates whether or not this cardholder 22 is for example, "highly trusted", "trusted", "don't know enough to trust", or "known to be a risk". And based on that, that merchant 24 decides whether or not merchant 24 should perform a secondary evaluation or step-up process, which is a secondary authentication process. The secondary authentication process may include the security questions described above. The merchant secondary authentication process may be triggered when cardholder 22 is attempting to perform activities inconsistent with the cardholder transaction history and/or cardholder profile. If cardholder 22 responds to the secondary authentication process correctly, an authorization request is submitted onto payment network 28. When that authorization request is processed through payment network 28, payment network 28 appends the merchant risk score into the authorization message and transmits the appended authorization request to issuer 30. Issuer then has an additional indication of trust for that cardholder 22 to facilitate making the authorization determination.

Figure 7:
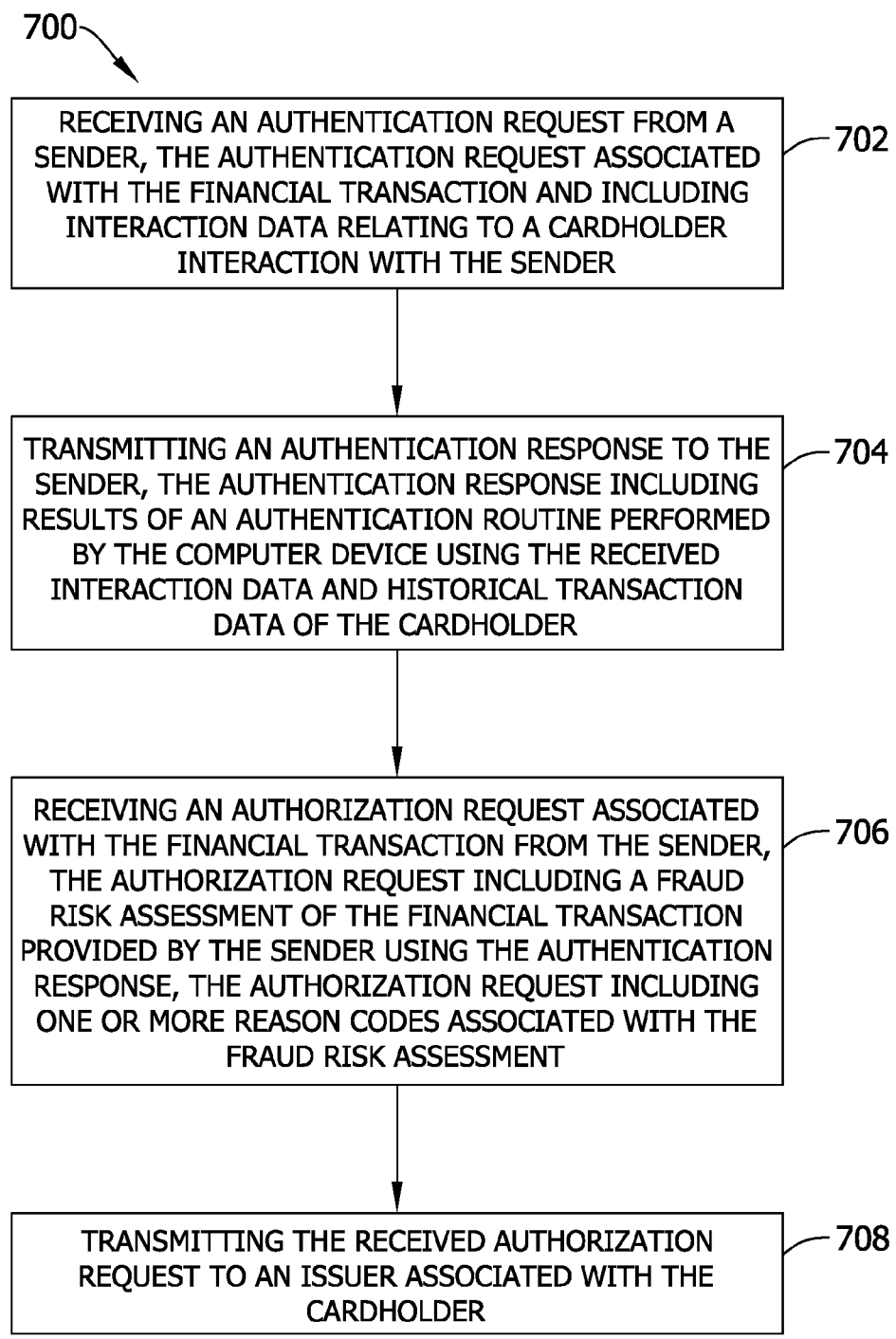

FIG. 7 is a flow chart of a method 700 of creating trust in a financial transaction based on a sender confidence level. In the example embodiment, method 700 includes receiving 702 an authentication request from the sender wherein the authentication request is associated with the financial transaction and includes interaction data relating to a cardholder interaction with the sender. Method 700 also includes transmitting 704 an authentication response to the sender, the authentication response including results of an authentication routine performed by the computer device using the received interaction data and historical transaction data of cardholder 22. Method 700 further includes receiving 706 an authorization request associated with the financial transaction from the sender, the authorization request including a fraud risk assessment of the financial transaction provided by the sender using the authentication response, the authorization request including one or more reason codes associated with the fraud risk assessment and transmitting 708 the received authorization request to an issuer associated with cardholder 22.

Figure 8:
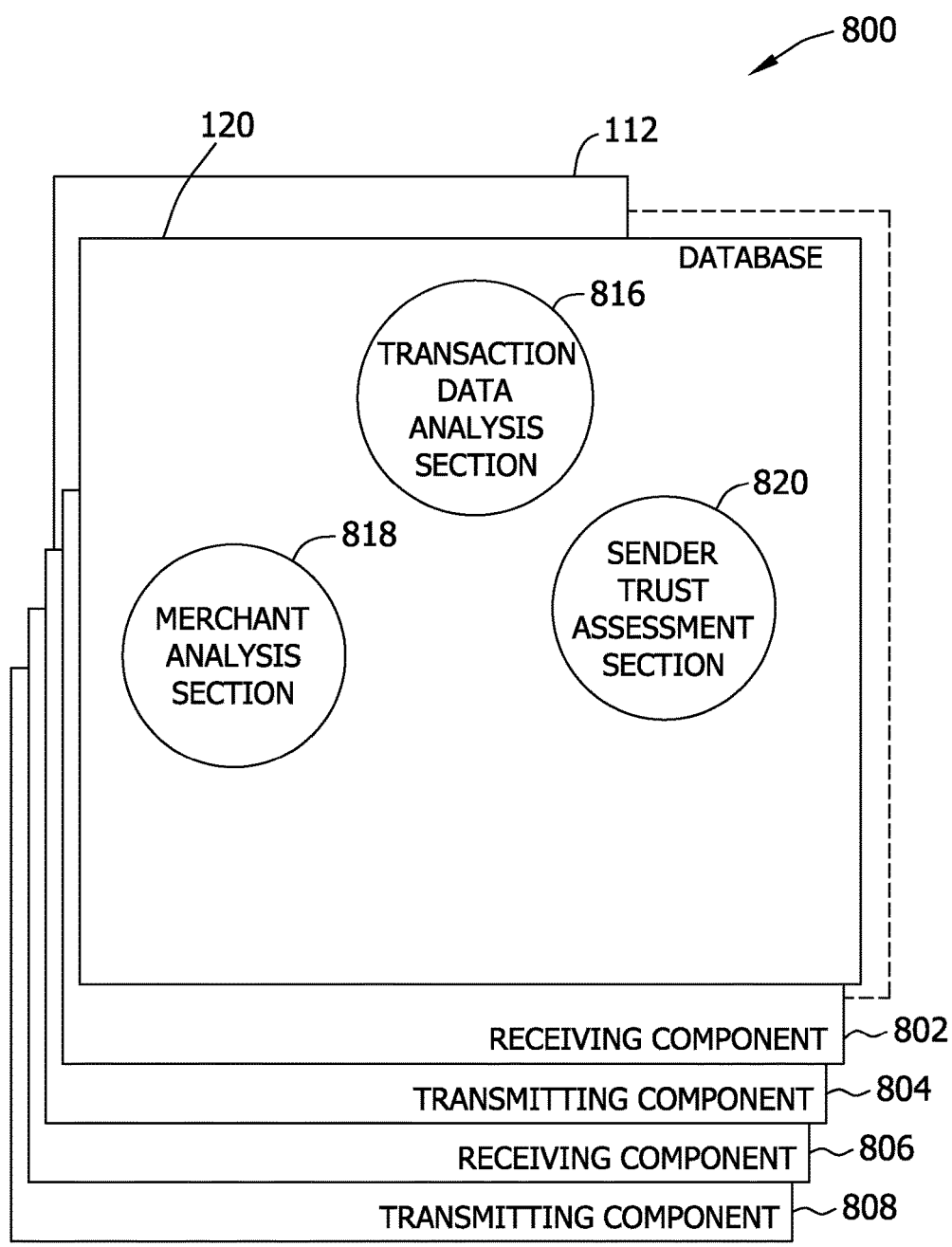

FIG. 8 is a diagram 800 of components of one or more example computing devices that may be used in the environment shown in FIG. 6. FIG. 8 further shows a configuration of databases including at least database 120 (shown in FIG. 2). Database 120 is coupled to several separate components communicatively coupled to sender trust assessment module 36, which perform specific tasks.

Sender trust assessment module 36 includes a receiving component 802 for receiving an authentication request from a sender wherein the authentication request is associated with a financial transaction and includes interaction data relating to a cardholder interaction with the sender. Sender trust assessment module 36 also includes a transmitting component 804 for transmitting an authentication response to the sender wherein the authentication response includes results of an authentication routine using the received interaction data and historical transaction data of cardholder 22. Sender trust assessment module 36 also includes a receiving component 806 for receiving an authorization request associated with the financial transaction from the sender, the authorization request including a fraud risk assessment of the financial transaction provided by the sender using the authentication response, the authorization request includes one or more reason codes associated with the fraud risk assessment. Sender trust assessment module 36 also includes a transmitting component 808 for transmitting the received authorization request to an issuer associated with cardholder 22.

In an exemplary embodiment, database 120 is divided into a plurality of sections, including but not limited to, a transaction data analysis section 816, a merchant analysis section 818, and a sender trust assessment section 820. These sections within database 120 are interconnected to update and retrieve the information as required.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

Authentication data attributes, as used herein, describes authentication data that may be stored at the multi-party payment card system and may include one or more attributes that may be used by or be required by the multi-party payment card system to authenticate users and/or cardholders. Different authentication data attributes may be required for different services provided by the multi-party payment card system. The authentication data may include various attributes used to authenticate the user to each of the different services offered or provided by the multi-party payment card system.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving an authentication request from a sender, the authentication request associated with the financial transaction and including interaction data relating to a cardholder interaction with the sender, (b) transmitting an authentication response to the sender, the authentication response including results of an authentication routine performed by the computer device using the received interaction data and historical transaction data of the cardholder, (c) receiving an authorization request associated with the financial transaction from the sender, the authorization request including a fraud risk assessment of the financial transaction provided by the sender using the authentication response, the authorization request including one or more reason codes associated with the fraud risk assessment, and transmitting the received authorization request to an issuer associated with the cardholder.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of creating trust in a financial transaction based on a sender confidence level provides a cost-effective and reliable means for improving a fraud determination with respect to the financial transaction using an assessment by the sender, typically the merchant, of the trustworthiness of the cardholder in the financial transaction. More specifically, the methods and systems described herein facilitate coordinating the communication of trust information between a merchant computer system, an interchange network computer system, and an issuer computer system. As a result, the methods and systems described herein facilitate automatically processing trust assessment information from a sender and historical financial transaction data from the interchange network to supplement a financial transaction authorization request to an issuer in a cost-effective and reliable manner.

Example methods and systems for assessing trust in a financial transaction based on a sender confidence level are described above in detail. The system illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for creating an assurance level based on authentication data attributes electronically captured by a merchant computing device, the method implemented using a computer device coupled to a memory device, the method comprising:
   receiving, from a sender, an authentication request message associated with a financial transaction initiated by a cardholder, wherein the authentication request message includes authentication data attributes relating to the cardholder's interaction with the merchant computing device;
   performing an authentication routine for authenticating the cardholder as the actual cardholder using the authentication data attributes;
   transmitting an authentication response to the sender including results of the authentication routine;
   receiving an authorization request message associated with the financial transaction from the sender, the authorization request message including a fraud risk assessment of the financial transaction determined using the authentication response, the authorization request message including one or more reason codes associated with fraud risk assessment; and
   transmitting the received authorization request message to an issuer associated with the cardholder.

2. The computer-based method of claim 1, further comprising generating an authentication response based on a correlating at least some of the authentication data attributes with previously authenticated cardholder data.

3. The computer-based method of claim 1, further comprising:
   performing the authentication routine based on correlating a device identifier of a device used by the cardholder to interact with a website associated with the merchant to a primary account number (PAN) associated with an account of the cardholder.

4. The computer-based method of claim 1, wherein the information relating to a cardholder interaction with the sender comprises information relating to the cardholder navigating a webpage of the merchant.

5. The computer-based method of claim 1, wherein the historical transaction data of the cardholder includes an indication of a longevity of the account of the cardholder.

6. The computer-based method of claim 1, wherein the fraud risk assessment is determined using an age of a cardholder profile with the merchant, wherein the age of the cardholder profile indicates a last update of the cardholder profile with the merchant.

7. The computer-based method of claim 1, further comprising:
   receiving at least one of an authorization approval and an authorization denial from the issuer, the at least one of the authorization approval and the authorization denial based at least in part on the fraud risk assessment by the sender; and
   transmitting the received at least one of the authorization approval and the authorization denial to the sender.

8. The computer-based method of claim 1, wherein the one or more reason codes include an indication of at least one of a longevity of the account of the cardholder, a time period since the profile of the cardholder has been updated, and a similarity of non-financial transaction interactions with the sender.

9. The computer-based method of claim 1, further comprising receiving a message from the sender relating to the financial transaction prior to receiving the authorization request message associated with the financial transaction, the message including a predefined sender confidence level data field that includes a fraud assessment of the financial transaction by the sender.

10. The computer-based method of claim 1, wherein the historical transaction data of the cardholder relates to a longevity of an account of the cardholder.

11. The computer-based method of claim 1, wherein the fraud risk assessment by the sender comprises determining an amount of time since an update of a profile of the cardholder with the sender.

12. The computer-based method of claim 1, further comprising:
   receiving at least one of an authorization approval message and an authorization denial message from the issuer, the at least one of the authorization approval message and the authorization denial message based at least in part on the fraud risk assessment determined by at least one of the sender and the merchant; and
   transmitting the received at least one of the authorization approval message and the authorization denial message to the sender.

13. The computer-based method of claim 1, wherein the sender and the merchant are the same.

14. A risk-based decisioning system for creating an assurance level based on authentication data attributes electronically captured by a merchant computer device, said system comprising the merchant computer device coupled to a payment network, said merchant computer device configured to:
   transmit an authentication request message to the payment network when a cardholder interacting with a merchant website is attempting to perform activities inconsistent with at least one of a transaction history of the cardholder and a profile of the cardholder;
   receive, from the payment network, an authentication response that indicates a trustworthiness of the cardholder;
   perform a secondary authentication evaluation that generates the merchant assessment of the trustworthiness of the cardholder based on the secondary authentication evaluation, wherein the secondary authentication evaluation is based at least partially upon the authentication response received from the payment network;

transmit an authorization request message onto the payment network if the generated merchant assessment of trustworthiness indicates the cardholder is trustworthy;

receive an authorization approval or denial based at least partially on the generated merchant assessment of trustworthiness; and complete a financial transaction based on the received authorization approval or denial.

15. The risk-based decisioning system of claim 14, wherein said merchant computer device is further configured to determine from interactions between the cardholder and the merchant website whether the cardholder is attempting to perform activities inconsistent with at least one of a transaction history of the cardholder and a profile of the cardholder.

16. The risk-based decisioning system of claim 14, wherein said secondary authentication evaluation comprises analyzing answers made by the cardholder to at least one of predetermined security questions and security questions determined in approximately real-time.

17. The risk-based decisioning system of claim 14, wherein the generated merchant assessment of trustworthiness indicates the cardholder is trustworthy when the generated merchant assessment of trustworthiness indicates the cardholder is not fraudulent.

18. One or more non-transitory computer-readable storage media having computer-executable instructions embodied thereon, wherein when executed by at least one processor, the computer-executable instructions cause the processor to:

receive, from a sender, an authentication request message associated with a financial transaction initiated by a cardholder, wherein the authentication request message includes authentication data attributes relating to the cardholder's interaction with a merchant computing device;

perform an authentication routine for authenticating the cardholder as the actual cardholder using the authentication data attributes;

transmit an authentication response to the sender including results of the authentication routine;

receive, from the sender, an authorization request message associated with the financial transaction, the authorization request message including a fraud risk assessment of the financial transaction determined using the authentication response, the authorization request message including one or more reason codes associated with the fraud risk assessment; and transmit the received authorization request message to an issuer associated with the cardholder.

19. The computer-readable storage media of claim 18, wherein the computer-executable instructions further cause the processor to receive interaction data relating to the cardholder navigating a webpage of the merchant.

20. The computer-readable storage media of claim 18, wherein the computer-executable instructions further cause the processor to generate a plurality of trust scores during the cardholder interaction with the merchant computing device, each successive trust score of the plurality of trust scores superseding all previous trust scores generated during the cardholder interaction with the merchant.

* * * * *